United States Patent
Tabata

(10) Patent No.: US 8,724,549 B2
(45) Date of Patent: May 13, 2014

(54) RADIO WAVE STATE DISPLAY SYSTEM, USER TERMINAL, ROUTER, RADIO WAVE STATE DISPLAY METHOD, AND PROGRAM

(75) Inventor: Tomoyasu Tabata, Tokyo (JP)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 13/356,097

(22) Filed: Jan. 23, 2012

(65) Prior Publication Data

US 2012/0188890 A1 Jul. 26, 2012

(30) Foreign Application Priority Data

Jan. 25, 2011 (JP) ................. 2011-012671

(51) Int. Cl.
*H04W 4/00* (2009.01)
(52) U.S. Cl.
USPC .......................................... 370/328
(58) Field of Classification Search
USPC ................... 370/252, 328–339; 455/421, 455/424–426.2, 436–444
See application file for complete search history.

(56) References Cited

U.S. PATENT DOCUMENTS

| 8,229,399 B2 * | 7/2012 | Tanabe | 455/411 |
| 2006/0270441 A1 * | 11/2006 | Miyata | 455/522 |
| 2007/0015546 A1 * | 1/2007 | Ito | 455/566 |
| 2009/0036116 A1 * | 2/2009 | Kim et al. | 455/423 |
| 2011/0269494 A1 * | 11/2011 | Kobayashi | 455/509 |

FOREIGN PATENT DOCUMENTS

JP 2002044729 A 2/2002

* cited by examiner

*Primary Examiner* — Frank Duong
(74) *Attorney, Agent, or Firm* — Sughrue Mion, PLLC

(57) ABSTRACT

A user terminal comprises: a wireless quality measurement unit that works according to a first wireless communication method and measures wireless quality thereof at a predetermined time interval; and a radio wave state display unit that integrally displays a radio wave state from the user terminal to a base station based on both a wireless quality of a first wireless section and a wireless quality of a second wireless section where a second wireless communication method is used, the wireless quality of the second wireless section measured by a router.

20 Claims, 7 Drawing Sheets

FIG. 3

| SECOND WIRELESS QUALITY y / FIRST WIRELESS QUALITY x | $y \leq TH_{y1}$ | $TH_{y1} < y \leq TH_{y2}$ | $TH_{y2} < y \leq TH_{y3}$ | $TH_{y3} < y \leq TH_{y4}$ | $TH_{y4} < y$ |
|---|---|---|---|---|---|
| $x \leq TH_{x1}$ | OUT OF SERVICE AREA (CANNOT RECEIVE DISPLAY CONTENTS) | OUT OF SERVICE AREA (CANNOT RECEIVE DISPLAY CONTENTS) | OUT OF SERVICE AREA (CANNOT RECEIVE DISPLAY CONTENTS) | OUT OF SERVICE AREA (CANNOT RECEIVE DISPLAY CONTENTS) | OUT OF SERVICE AREA (CANNOT RECEIVE DISPLAY CONTENTS) |
| $TH_{x1} < x \leq TH_{x2}$ | OUT OF SERVICE AREA | VERY WEAK | VERY WEAK | VERY WEAK | VERY WEAK |
| $TH_{x2} < x \leq TH_{x3}$ | OUT OF SERVICE AREA | VERY WEAK | WEAK | WEAK | WEAK |
| $TH_{x3} < x \leq TH_{x4}$ | OUT OF SERVICE AREA | VERY WEAK | WEAK | INTERMEDIATE | INTERMEDIATE |
| $TH_{x4} < x$ | OUT OF SERVICE AREA | VERY WEAK | WEAK | INTERMEDIATE | STRONG |

FIG. 4

| | STATE | INTEGRATED DISPLAY CONTENTS |
|---|---|---|
| COMMUNICATION STATE | COMMUNICATING WITH NETWORK | GREEN(ON) |
| | IN CONNECTING PROCESS TO NETWORK | GREEN(BLINK) |
| | CONNECTION TO NETWORK FAILED | RED(ON) |
| | DISCONNECTED FROM NETWORK | OFF |
| GENERAL RADIO WAVE INTENSITY | STRONG LEVEL | FOUR WAVE MARKS ON |
| | INTERMEDIATE LEVEL | THREE WAVE MARKS ON |
| | WEAK LEVEL | TWO WAVE MARKS ON |
| | VERY WEAK LEVEL | ONE WAVE MARK ON |
| | OUT OF SERVICE AREA | OFF |

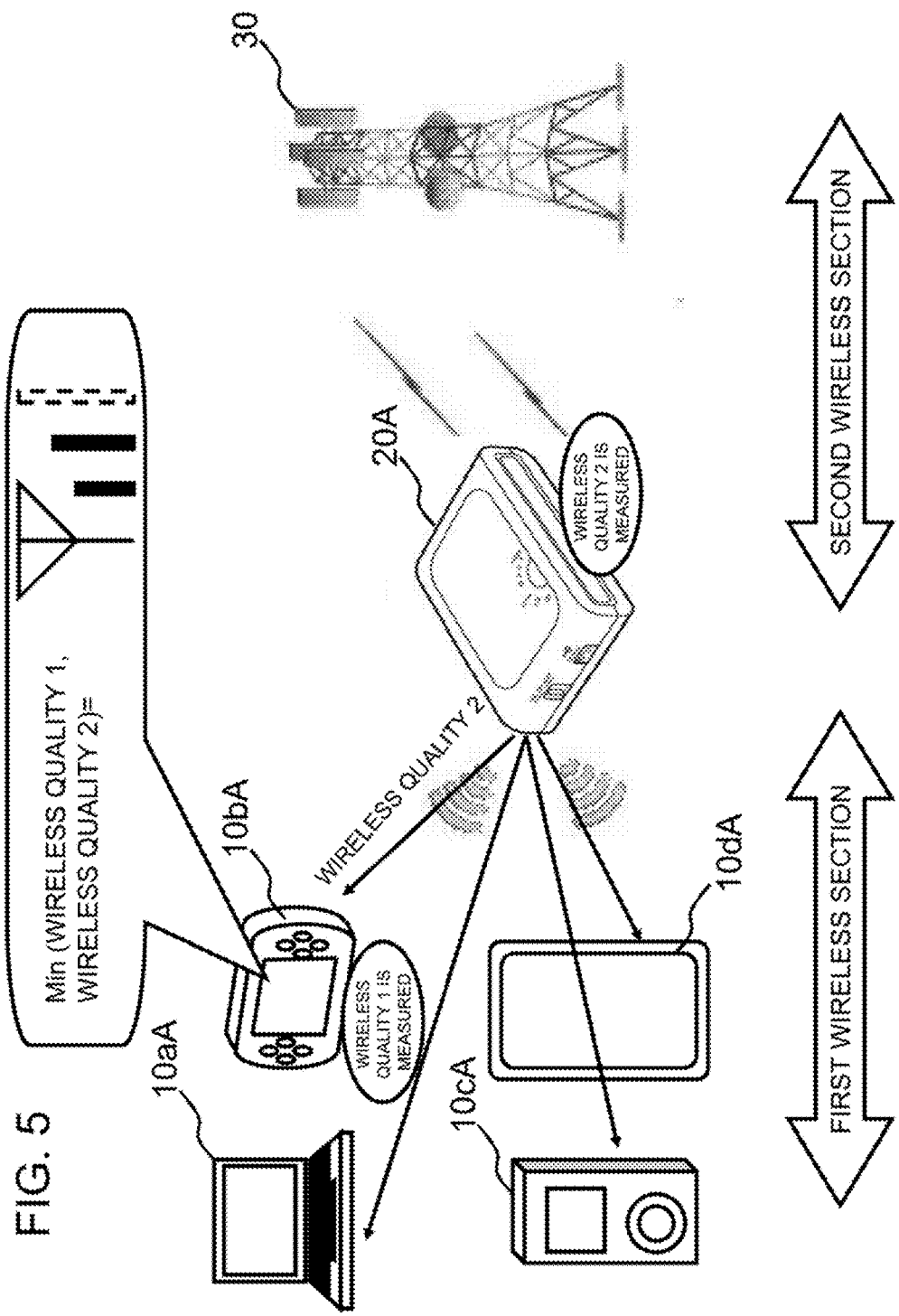

FIG. 7

| SECOND WIRELESS QUALITY y / FIRST WIRELESS QUALITY x | y ≤ THy1 | THy1 < y ≤ THy2 | THy2 < y ≤ THy3 | THy3 < y ≤ THy4 | THy4 < y |
|---|---|---|---|---|---|
| x ≤ THx1 | OUT OF SERVICE AREA (CANNOT RECEIVE SECOND WIRELESS QUALITY) | OUT OF SERVICE AREA (CANNOT RECEIVE SECOND WIRELESS QUALITY) | OUT OF SERVICE AREA (CANNOT RECEIVE SECOND WIRELESS QUALITY) | OUT OF SERVICE AREA (CANNOT RECEIVE SECOND WIRELESS QUALITY) | OUT OF SERVICE AREA (CANNOT RECEIVE SECOND WIRELESS QUALITY) |
| THx1 < x ≤ THx2 | OUT OF SERVICE | VERY WEAK | VERY WEAK | VERY WEAK | VERY WEAK |
| THx2 < x ≤ THx3 | OUT OF SERVICE | VERY WEAK | WEAK | WEAK | WEAK |
| THx3 < x ≤ THx4 | OUT OF SERVICE | VERY WEAK | WEAK | INTERMEDIATE | INTERMEDIATE |
| THx4 < x | OUT OF SERVICE | VERY WEAK | WEAK | INTERMEDIATE | STRONG |

RADIO WAVE STATE DISPLAY SYSTEM, USER TERMINAL, ROUTER, RADIO WAVE STATE DISPLAY METHOD, AND PROGRAM

REFERENCE TO RELATED APPLICATION

This application is based upon and claims the benefit of the priority of Japanese patent application No. 2011-012671, filed on Jan. 25, 2011, the disclosure of which is incorporated herein in its entirety by reference thereto.

TECHNICAL FIELD

The present invention relates to a radio wave state display system, a user terminal, a router, a radio wave state display method, and a computer program, and more particularly to a radio wave state display system, a user terminal, a router, a radio wave state display method, and a computer program in a configuration in which the wireless communication method between a user terminal and a wireless access point and that between the wireless access point and a base station is different.

BACKGROUND

An apparatus called a mobile router is known that is used on a highly functional mobile terminal called a tablet PC or a smartphone. This easy-to-carry mobile router allows the user to connect to a high-speed mobile broadband line. Recently, attention has been paid to a mobile WiMAX router and a mobile 3G router. The mobile WiMAX router provides a user terminal of a wireless LAN (Local-Area Network), the most widely used network today, with the connection environment of WiMAX that is expanding its coverage area. The mobile 3G router is a router designed for 3G communication lines.

Patent Document 1 discloses a mobile wireless terminal that allows the user to confirm available communication services and communication systems instantly. More specifically, the mobile wireless terminal disclosed in the document analyzes the communication services provided by the available communication systems and, within the communication capability of that terminal, displays the communication services in real time. In addition, if there are multiple communication systems that are available for use, the disclosed wireless terminal displays the communication service and radio wave reception level for each of those communication systems.

[Patent Document 1] Japanese Patent Kokai Publication No. JP-P2002-44729A

SUMMARY

The above Patent Document 1 is incorporated herein by reference thereto.

The following analysis is given by the present invention.

However, for easy connection to the Internet using a mobile router such as the mobile WiMAX router described above, two different networks must be both in a good wireless state. The problem here is that it is difficult for the user terminal to monitor the radio wave state between a mobile router and a base station.

For example, when the user tries to access the Internet outside the home without noticing that the user is out of the WiMAX or 3G service area, it is possible that the user waits for a while and then receives an error. In this case, because the message is displayed on the user terminal screen indicating that the user terminal is connected to the mobile router via a wireless LAN, the user notifies that the user is out of the WiMAX or 3G service area only after confirming the state display lamp on the mobile router.

In this respect, the mobile wireless terminal disclosed in Patent Document 1 displays only the communication services and radio wave reception levels that the terminal can use. The mobile wireless terminal does not have the function to display the radio wave state beyond the mobile router.

In view of the foregoing, it is an object of the present invention to provide a configuration and a method for allowing the user to monitor the radio wave state easily when a mobile router, such as the one described above, is used.

According to a first aspect of the present invention, there is provided a radio wave state display system, comprising: a user terminal that works according to a first wireless communication method; and a router that connects to a base station via a second wireless communication method and functions as a wireless access point of a user terminal that works according to the first wireless communication method, the second wireless communication method being different from the first wireless communication method. The user terminal has a radio wave state display unit that integrally displays a radio wave state from the user terminal to the base station based on both a wireless quality of a first wireless section where the first wireless communication method is used and a wireless quality of a second wireless section where the second wireless communication method is used. The wireless quality of the first wireless section is measured by the user terminal, and the wireless quality of the second wireless section is measured by the router.

According to a second aspect of the present invention, there is provided a user terminal, comprising: a wireless quality measurement unit that works according to a first wireless communication method and measures wireless quality, thereof at a predetermined time interval; and a radio wave state display unit that integrally displays a radio wave state representing a state of a section ranging from the user terminal to a base station based on both a wireless quality of a first wireless section and a wireless quality of a second wireless section where a second wireless communication method is used. The wireless quality of the second wireless section is measured by a router.

According to a third aspect of the present invention, there is provided a router that measures the wireless quality of the second wireless section and transmits the measured wireless quality to the user terminal or a router that determines contents to be displayed on the user terminal based on the wireless quality of the first and second wireless sections and causes the user terminal to display the determined contents.

According to a fourth aspect of the present invention, there is provided a radio wave state display method. The method comprises: measuring, by a user terminal, a wireless quality of a first wireless section, where a first wireless communication method is used, at a predetermined time interval, the user terminal working according to the first wireless communication method. The method further comprises: measuring, by a router, a wireless quality of a second wireless section where a second wireless communication method is used, the router connecting to a base station via the second wireless communication method and functioning as a wireless access point of the user terminal working according to the first wireless communication method. The second wireless communication method different from the first wireless communication method. The method further comprises: integrally displaying, by the router, a radio wave state, from the user terminal to the base station, on the user terminal based on both the wireless quality of the first wireless section and the wireless quality of the second wireless section. This method is associated with particular machines, a user terminal that works according to the first wireless communication method and a router that functions as the wireless access point of the user terminal.

According to a fifth aspect of the present invention, there is provided a program that implements the function of the user terminal and the router. The program can be recorded on a computer readable storage medium which is, in particular, non-transient. That is, the present invention may be embodied as a computer program product.

The meritorious effects of the present invention include at least as follows.

The present invention allows the user, who uses the mobile router, to easily monitor the wireless state beyond the mobile router.

BRIEF DESCRIPTION OF THE DRAWINGS

FIG. 3 is a diagram showing an example of a table used to determine the radio wave state that is integrally displayed on the user terminal in the first exemplary embodiment of the present invention.

FIG. 4 is a diagram showing an example of the contents integrally displayed on the user terminal in the first exemplary embodiment of the present invention.

FIG. 5 is a diagram showing the outline of a second exemplary embodiment of the present invention.

FIG. 7 is a diagram showing an example of a table used to determine the radio wave state that is integrally displayed on the user terminal in the second exemplary embodiment of the present invention.

PREFERRED MODES

Figure 1:
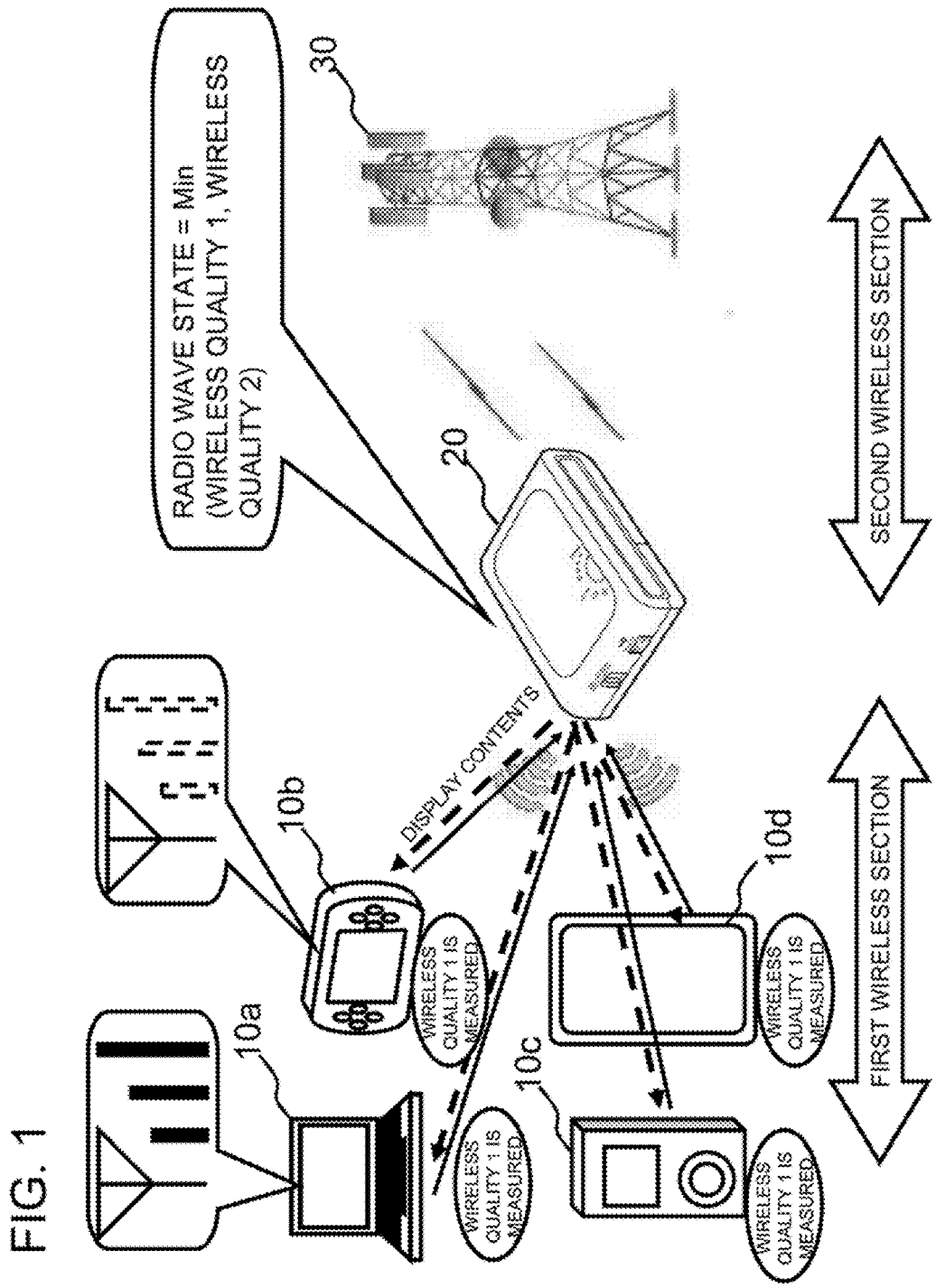
FIG. 1 is a diagram showing the outline of the present invention.

First, the following describes the outline of the present invention with reference to the drawings. Note that the drawing reference numerals used in this outline are attached to the elements to help understand the present invention but are not intended to limit the present invention to the mode(s) shown in the figures.

As shown in FIG. 1, the present invention is implemented by a configuration that includes user terminals 10a-10d and a router 20. The user terminals 10a-10d support a first wireless communication method. The router 20 is connected to a base station 30 via a second wireless communication method, different from the first wireless communication method described above, and functions as the wireless access point of the user terminals 10a-10d.

The user terminals 10a-10d measure the wireless quality (first wireless quality) of the first wireless section, where the first wireless communication method is used, at a predetermined time interval and transmits the result to the router 20.

On the other hand, based on the signal received from the base station 30, the router 20 measures the wireless quality (second wireless quality) of the second wireless section where the second wireless communication method is used.

In addition, based on the first wireless quality and the second wireless quality, the router 20 determines the contents to be displayed on each of the user terminals 10a-10d to indicate the radio wave state representing a state of a section ranging from the user terminal to the base station and then transmits the contents to each of the user terminals 10a-10d. As described above, the first wireless quality is the wireless quality of the first wireless section, where the first communication method is used, and is received from the user terminals 10a-10d, and the second wireless quality is the wireless quality of the second wireless section where the second wireless communication method is used.

Each of the user terminals 10a-10d displays the radio wave state in a section ranging from the user terminal to the base station, received from the router 20, using an icon on the screen or the radio wave display lamp.

For example, as shown in FIG. 1, each terminal can display one of the first wireless quality and the second wireless quality, corresponding to a worse radio wave state ((Min(first wireless quality, second wireless quality)), in an incremental manner in terms (logos) of the number of antennas. This display allows the user to determine whether the terminal the user is currently using is connectable to an external network via the router 20. When the number of antennas (logos) is decreased to indicate that the radio wave state is bad (see a mobile game terminal 10b in FIG. 1), the user can take an action to approach the router 20, to switch to a wired connection, or to change the location of the router 20.

Although a personal computer 10a, a mobile game terminal 10b, a mobile music player 10c, and a tablet terminal 10d are shown as the user terminal in the example in FIG. 1, the user terminal is not limited to those devices.

First Exemplary Embodiment

Figure 2:
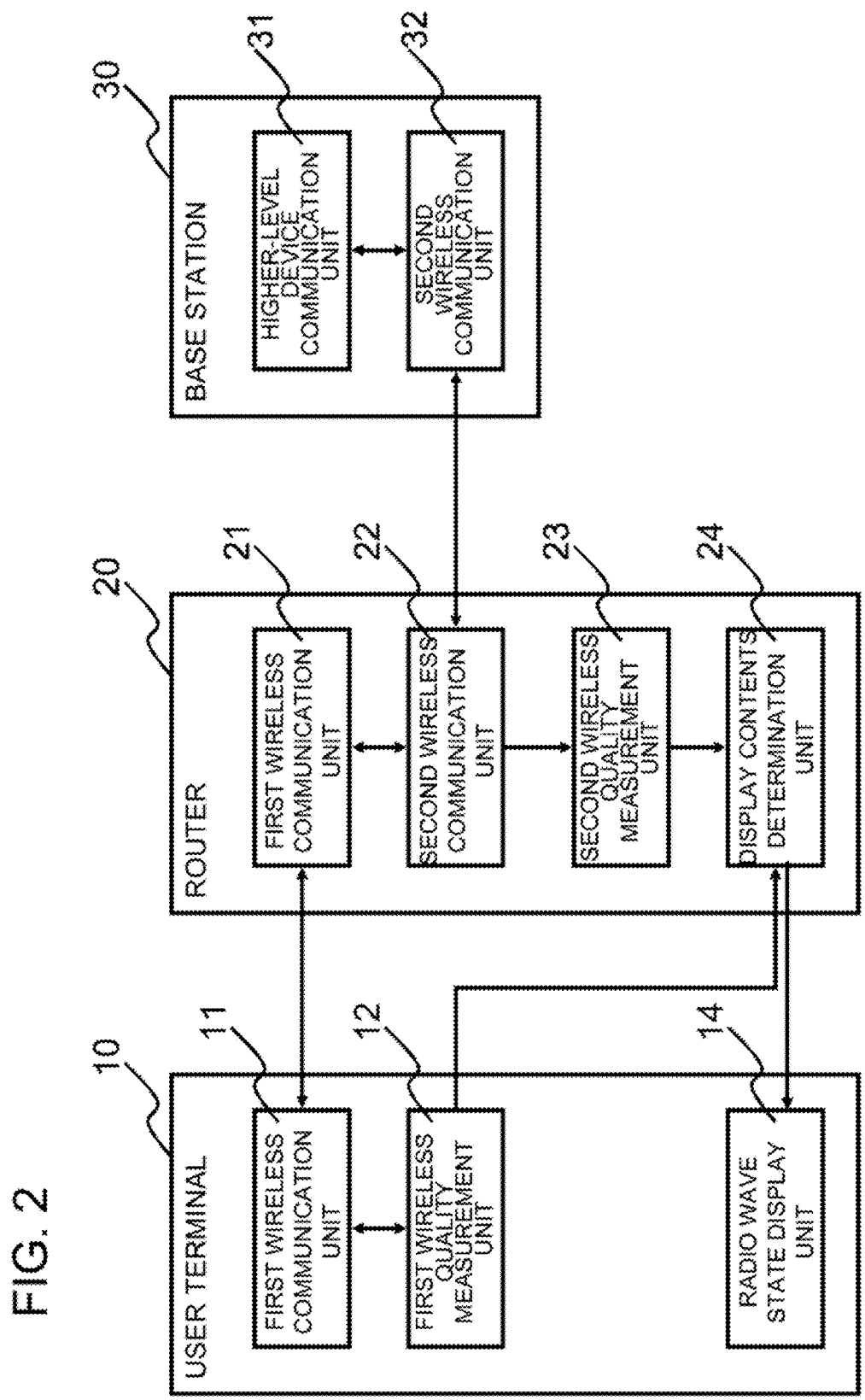
FIG. 2 is a block diagram showing a configuration of a first exemplary embodiment of the present invention.

Next, a first exemplary embodiment of the present invention will be described in detail with reference to the drawings. FIG. 2 is a block diagram showing the configuration of the first exemplary embodiment of the present invention. FIG. 2 shows a user terminal 10, a router 20, and a base station 30.

The user terminal 10 comprises a first wireless communication unit 11, a first wireless quality measurement unit 12, and a radio wave state display unit 14. The first wireless communication unit 11 accesses the router 20 using the first wireless communication method. The first wireless quality measurement unit 12 measures the wireless quality of the first wireless section (first wireless quality), where the first wireless communication method is used, and transmits the measured wireless quality to the router 20. The radio wave state display unit 14 displays the state of a radio wave received from the router 20.

In the description below, assume that the first wireless communication method is a wireless LAN. Therefore, the first wireless communication unit 11 and the first wireless quality measurement unit 12 of the user terminal 10 may be implemented based on the wireless LAN communication function, provided in a wireless LAN capable apparatus, and the radio wave state measurement function that measures the radio field intensity (dB) of the router 20 and notifies the user whether wireless LAN communication can be performed. As another first wireless communication method, the near field wireless communication method such as Bluetooth (registered trademark) may also be used.

The radio wave state display unit 14 is implemented by a program that displays the radio wave state, which will be described later, at a predetermined position on the screen of the user terminal 10 using an icon. The radio wave state display unit 14 may be implemented by a utility program, supplied from the vendor of the user terminal 10 or the router 20, or as a function of the operating system.

The router 20 comprises a first wireless communication unit 21, a second wireless communication unit 22, a second wireless quality measurement unit 23, and a display contents determination unit 24. The first wireless communication unit 21 accepts access from the user terminal 10. The second wireless communication unit 22 connects to the base station 30 using the second wireless communication method, different from the first wireless communication method described above, and performs the function of the wireless access point. The second wireless quality measurement unit 23 measures the wireless quality of the second wireless section (second wireless quality), where the second wireless communication method is used, at a predetermined time interval. The display contents determination unit 24 determines the contents to be displayed on the radio wave state display unit 14 of the user terminal 10, based on the wireless quality of the first wireless section (first wireless quality) received from the user terminal 10 and the wireless quality of the second wireless section (second wireless quality), and transmits the determined contents to the user terminal 10.

The base station 30 comprises a higher-level device communication unit 31 and a second wireless communication unit 32. The higher-level device communication unit 31 communicates with a higher-level device. The second wireless communication unit 32 communicates with the second wireless communication unit 22 of the router 20.

In the description below, assume that the second wireless communication method is mobile WiMAX defined by IEEE802.16e-2005 and that the base station 30 is a WiMAX base station that configures a WiMAX network. Therefore, the first wireless communication unit 21, second wireless communication unit 22, and the second wireless quality measurement unit 23 of the router 20 may be implemented by the mobile WiMAX communication function provided in a mobile WiMAX router and by the measurement function of the wireless quality values, such as the Carrier to Interference and Noise Ratio (CINR) and the Received Signal Strength Indication (RSSI), to be reported to the WiMAX base station side. As another second wireless communication method the successor method of mobile WiMAX (WiMAX2, etc.), Long Term Evolution (LTE), or High Speed Downlink Packet Access (HSDPA) may also be used. In this case, too, the second wireless communication unit 22 and the second wireless quality measurement unit 23 may be implemented by the function of a mobile router corresponding to those methods.

The following describes in detail the display contents determination method used by the display contents determination unit 24 of the router 20. FIG. 3 is a diagram showing an example of the table referenced by the display contents determination unit 24 to obtain the radio wave state to be displayed on the user terminal.

In the example shown in FIG. 3, if at least one of the first wireless quality and the second wireless quality is equal to or lower than the lower limit threshold (THx1, THy1) defined for each of the first wireless quality and the second wireless quality, the table indicates that the "out of service area" display is determined. This display allows the user to recognize that at least one of the wireless LAN and WiMAX is in the communication-disabled state. In the example in FIG. 3, if the first wireless quality is equal to or lower than the lower limit threshold, the table indicates the state as "out of service area (cannot receive display contents)" because the display contents cannot be received from the display contents determination unit 24. When the display contents are transmitted via means other than a wireless LAN, there is no need for this distinction.

In the example shown in FIG. 3, if both first wireless quality and second wireless quality exceed the lower limit threshold (THx1, THy1) but if one of them is equal to or lower than the next-higher threshold (THx2, THy2) of the lower-limit threshold (THx1, Thy1), the table indicates that the "very weak" display is determined. This display allows the user to recognize that at least one of the wireless LAN and WiMAX is in the bad communication state.

On the other hand, in the example shown in FIG. 3, if both first wireless quality and second wireless quality exceed the threshold (THx4, THy4) defined for each of the first wireless quality and the second wireless quality, the table indicates that the "strong" display is determined.

In the example in FIG. 3, though both first wireless quality and second wireless quality are compared with four thresholds to determine the display contents as one of five levels, "out of service area" to "strong", the number of levels may be set arbitrarily. It is also possible to provide the "error" display to indicate an abnormal value of the first wireless quality and the second wireless quality. Instead of the thresholds described above, the Modulation and Coding Scheme (MCS) obtained by the router 20 side may also be used to determine the wireless quality level.

FIG. 4 is a diagram showing an example of the contents integrally displayed on the radio wave state display unit 14 of the user terminal. In the example in FIG. 4, the background color of the antenna indicates the communication state and, as the overall radio wave intensity, the number of wave marks represents the contents determined by the display contents determination unit 24 of the router 20.

As described above, this exemplary embodiment allows the user, who accesses the Internet via the router 20, to monitor the radio wave state including the wireless state in a communication section extending beyond the router 20.

The units (processing, means) of the user terminal 10 and router 20 shown in FIG. 2 may also be implemented by a computer program that causes the computer, which configures the user terminal 10 and router 20, to execute the above-described processing on the hardware.

Second Exemplary Embodiment

Next, a second exemplary embodiment, in which changes are added to the configuration of the first exemplary embodiment described above, will be described in detail with reference to the drawings. The following describes the second exemplary embodiment with emphasis on the difference from the first exemplary embodiment. FIG. 5 is a diagram showing the outline of the second exemplary embodiment of the present invention. The difference from the first exemplary embodiment is that a router 20A transmits the wireless quality of the second wireless section (second wireless quality) to user terminals 10aA-10dA and that the user terminals 10aA-10dA use the wireless quality of the first wireless section (first wireless quality), measured by each of the terminals, to determine and display the contents of the radio wave state from the user terminals to the base station.

Figure 6:
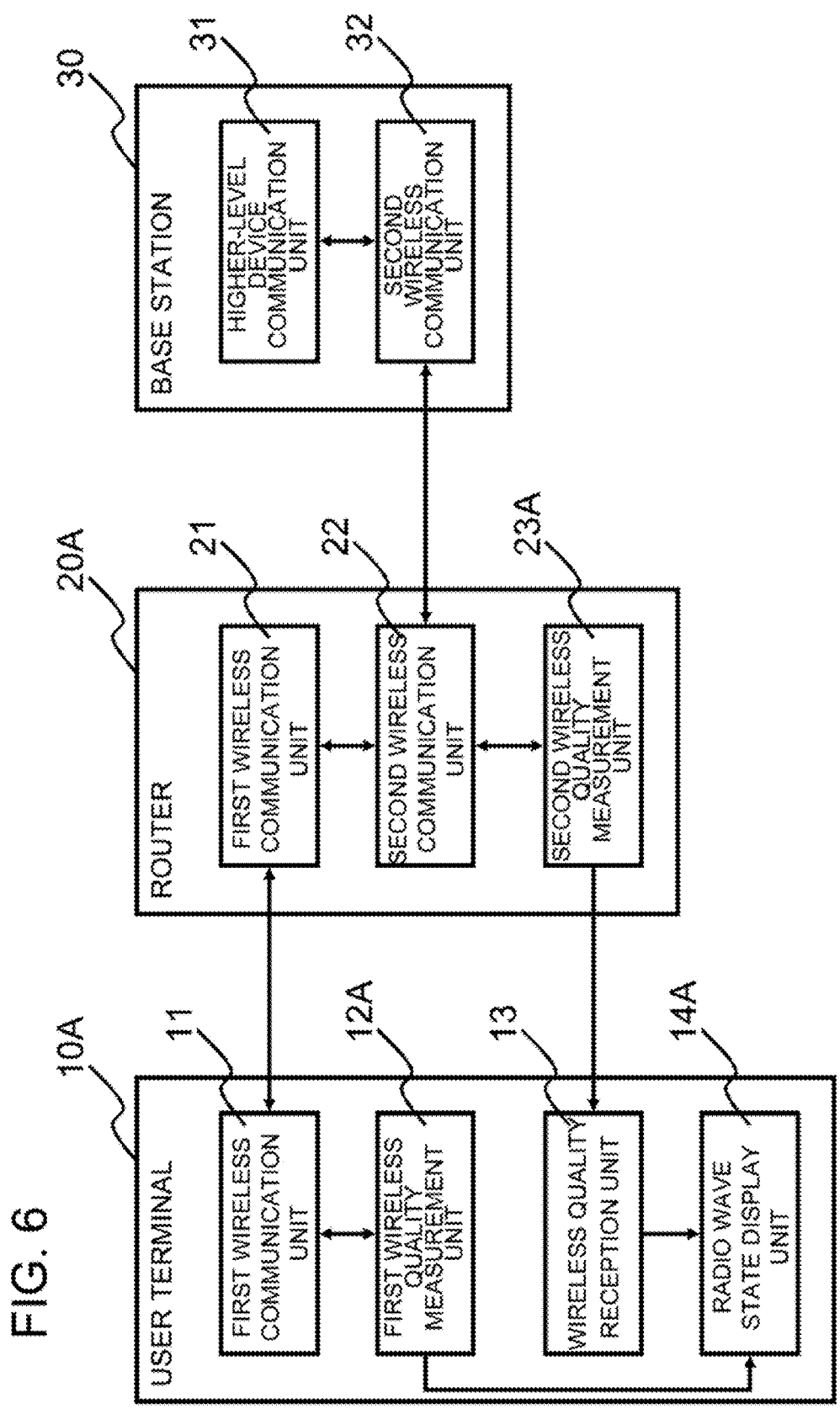
FIG. 6 is a block diagram showing the configuration of the second exemplary embodiment of the present invention.

FIG. 6 is a block diagram showing a configuration of the second exemplary embodiment of the present invention. The difference from the configuration of the first exemplary embodiment shown in FIG. 2 is that a wireless quality reception unit 13 is added to the user terminal 10A and that a second wireless quality measurement unit 23A of the router 20A transmits the wireless quality of the second wireless section (second wireless quality) to the user terminal 10A. Another difference is that a radio wave state display unit 14A of the user terminal 10A receives the first and second wireless quality from a first wireless quality measurement unit 12A and the wireless quality reception unit 13 and performs the function corresponding to the display contents determination unit 24 of the router 20.

The units (processing means) of the user terminal 10A and the router 20A shown in FIG. 6 may also be implemented by a computer program that causes the computer, which configures the user terminal 10A and the router 20A, to execute the above-described processing on the hardware.

FIG. 7 is a diagram showing an example of the table referenced by the radio wave state display unit 14A of the user terminal 10A to obtain the contents to be displayed as the radio wave state in a section extending from the user terminal to the base station.

This table is almost similar to that shown in FIG. 3 except that, if the first wireless quality is equal to or lower than the lower limit threshold, the table indicates the state as "out of service area (cannot receive second wireless quality)" because the second wireless quality cannot be received from the second wireless quality measurement unit 23A. In this exemplary embodiment too, when the second wireless quality is transmitted via means other than a wireless LAN, there is no need for this distinction.

As described above, the present invention may also be implemented by a configuration in which the user terminal 10A determines the display contents.

While one exemplary embodiment of the present invention has been described, it is to be understood that the present invention is not limited to the exemplary embodiment described above and that any other modification, replacement, and adjustment may be added in the scope not departing from the basic technological concept of the present invention. For example, though the icons shown in FIG. 4 are used to notify the radio wave state to the user in the exemplary embodiment, the user terminal or the router 20 may also display a change in the radio wave state (connection failure, recovery) and its failure location (first or second wireless section). Voice guidance may also be used as necessary.

Finally, the following summarizes the preferred modes of the present invention.

[First Mode]

(See the radio wave state display system in the first aspect above)

[Second Mode]

The radio wave state display system described in the first mode wherein if at least one of a value indicating the wireless quality of the first wireless section and a value indicating the wireless quality of the second wireless section is equal to or lower than a first threshold defined for each wireless quality, the radio wave state display unit provides a display indicating that the user terminal is out of a service area.

[Third Mode]

The radio wave state display system described in the first or second mode wherein if both the value indicating the wireless quality of the first wireless section and the value indicating the wireless quality of the second wireless section exceed the first threshold but at least one of the values is equal to or lower than a second threshold that is higher than the first threshold, the radio wave state display unit provides a display indicating that the radio wave state is worst.

[Fourth Mode]

The radio wave state display system described in one of the first to third modes wherein the router receives wireless quality information on the first wireless section from a plurality of user terminals and determines contents to be displayed on the radio wave state display unit of each user terminal.

[Fifth Mode]

The radio wave state display system described in one of the first to third modes wherein the user terminal receives wireless quality information on the second wireless section from the router and determines display contents.

[Sixth Mode]

The radio wave state display system described in one of the first to fifth modes wherein the radio wave display unit displays a first icon that displays the radio wave state in an incremental manner and a second icon that displays the communication state of the user terminal in a color-coded image.

[Seventh Mode]

The radio wave state display system described in one of the first to sixth modes wherein the first wireless communication method is a wireless LAN or Bluetooth (registered trademark) and the second wireless communication method is one of mobile WiMAX, WiMAX2, LTE, and HSDPA.

[Eighth Mode]

(See the user terminal in the second aspect above)

[Ninth Mode]

The user terminal described in the eighth mode wherein if at least one of a value indicating the wireless quality of the first wireless section and a value indicating the wireless quality of the second wireless section, received from the router, is equal to or lower than a predetermined first threshold defined for each wireless quality, the radio wave state display unit provides a display indicating that the user terminal is out of a service area.

[Tenth Mode]

The user terminal described in the eighth or ninth mode wherein if both the value indicating the wireless quality of the first wireless section and the value indicating the wireless quality of the second wireless section exceed the first threshold but at least one of the values is equal to or lower than a second threshold that is higher than the first threshold, the radio wave state display unit provides a display indicating that the radio wave state is worst.

[Eleventh Mode]

The user terminal described in one of the eighth to tenth modes wherein the user terminal transmits the wireless quality information on the first wireless section to the router and displays the contents, received from the router, on the radio wave state display unit.

[Twelfth Mode]

The user terminal described in one of the eighth to tenth modes wherein the user terminal receives the wireless quality in on the second wireless section from the router and determines the display contents.

[Thirteenth Mode]

The user terminal described in one of the eighth to twelfth modes wherein the radio wave display unit displays a first icon that displays the radio wave state in an incremental manner and a second icon that displays the communication state of the user terminal in a color-coded image.

[Fourteenth Mode]

The user terminal described in one of the eighth to thirteenth modes wherein the first wireless communication method is a wireless LAN or Bluetooth (registered trademark) and the second wireless communication method is one of mobile WiMAX, WiMAX2, LTE, and HSDPA.

[Fifteenth Mode]

A router that functions as a wireless access point of the user terminal described in one of the eighth to fourteenth modes and transmits wireless quality information on the second wireless section to the user terminal, wherein the wireless quality information is calculated based on a signal received from the base station connected via the second wireless communication method.

[Sixteenth Mode]

A router that connects to a base station via a second wireless communication method and functions as a wireless access point of a user terminal working according to a first wireless communication method and that, based on both a wireless quality of a first wireless section where the first wireless communication method is used and a wireless quality of a second wireless section where the second wireless communication method is used, transmits contents to be displayed on the user terminal as a radio wave state, wherein the second wireless communication method is different from the first wireless communication method, the wireless quality of the first wireless section is received from the user terminal and measured by the user terminal, and the wireless quality of the second wireless section is measured by the router.

[Seventeenth Mode]

(See the radio wave state display method in the fourth aspect above)

[Eighteenth Mode]

A program causing a computer, which is installed in a router that connects to a base station via a second wireless communication method, different from a first wireless communication method, and functions as a wireless access point of a user terminal working according to the first wireless communication method, to perform the processing of:

receiving a wireless quality of a first wireless section where the first wireless communication method is used, the wireless quality of the first wireless section measured by the user terminal;

measuring a wireless quality of a second wireless section where the second wireless communication method is used; and determining contents to be integrally displayed on the user terminal as a radio wave state from the user terminal to the base station based on both a wireless quality of the first wireless section and a wireless quality of the second wireless section and then transmitting the determined contents to the user terminal.

[Nineteenth Mode]

A program causing a computer, installed in a user terminal working according to a first wireless communication method, to perform the processing of:

measuring a wireless quality of a first wireless section at a predetermined time interval;

receiving wireless quality information on a second wireless section, where a second wireless communication method is used, from a router that connects to a base station via the second wireless communication method and functions as a wireless access point of the user terminal working according to the first wireless communication method, the second wireless communication method different from the first wireless communication method; and integrally displaying a radio wave state, from the user terminal to the base station, based on both the wireless quality of the first wireless section and the wireless quality of the second wireless section.

It should be noted that other objects, features and aspects of the present invention will become apparent in the entire disclosure and that modifications may be done without departing the gist and scope of the present invention as disclosed herein and claimed as appended herewith.

Also it should be noted that any combination or selection of the disclosed and/or claimed elements, matters and/or items may fall under the modifications aforementioned.

What is claimed is:

1. A user terminal, comprising:
   a wireless quality measurement unit that works according to a first wireless communication method and measures wireless quality thereof at a predetermined time interval; and
   a radio wave state display unit that integrally displays a radio wave state from the user terminal to a base station based on both a wireless quality of a first wireless section and a wireless quality of a second wireless section where a second wireless communication method is used, the wireless quality of the second wireless section measured by a router.

2. The user terminal as defined by claim 1, wherein
   if at least one of a value indicating the wireless quality of the first wireless section and a value indicating the wireless quality of the second wireless section, received from the router, is equal to or lower than a predetermined first threshold defined for each wireless quality, the radio wave state display unit provides a display indicating that the user terminal is out of a service area.

3. The user terminal as defined by claim 1, wherein
   if both the value indicating the wireless quality of the first wireless section and the value indicating the wireless quality of the second wireless section exceed the first threshold but at least one of the values is equal to or lower than a second threshold that is higher than the first threshold, the radio wave state display unit provides a display indicating that the radio wave state is worst.

4. The user terminal as defined by claim 1, wherein
   the user terminal transmits the wireless quality information on the first wireless section to the router and displays the contents, received from the router, on the radio wave state display unit.

5. The user terminal as defined by claim 1, wherein
   the user terminal receives the wireless quality in on the second wireless section from the router and determines the display contents.

6. The user terminal as defined by claim 1, wherein
   the radio wave display unit displays
   a first icon that indicates the radio wave state in an incremental manner and
   a second icon that indicates the communication state of the user terminal in a color-coded image.

7. The user terminal as defined by claim 1, wherein
   the first wireless communication method is a wireless LAN or Bluetooth and
   the second wireless communication method is one of mobile WiMAX, WiMAX2, LTE, and HSDPA.

8. The user terminal as defined by claim 2, wherein
   the radio wave display unit displays
   a first icon that indicates the radio wave state in an incremental manner and
   a second icon that indicates the communication state of the user terminal in a color-coded image.

9. The user terminal as defined by claim 3, wherein
the radio wave display unit displays
a first icon that indicates the radio wave state in an incremental manner and
a second icon that indicates the communication state of the user terminal in a color-coded image.

10. The user terminal as defined by claim 2, wherein
if both the value indicating the wireless quality of the first wireless section and the value indicating the wireless quality of the second wireless section exceed the first threshold but at least one of the values is equal to or lower than a second threshold that is higher than the first threshold, the radio wave state display unit provides a display indicating that the radio wave state is worst.

11. The user terminal as defined by claim 10, wherein
the radio wave display unit displays
a first icon that indicates the radio wave state in an incremental manner and
a second icon that indicates the communication state of the user terminal in a color-coded image.

12. The user terminal as defined by claim 2, wherein
the user terminal transmits the wireless quality information on the first wireless section to the router and displays the contents, received from the router, on the radio wave state display unit.

13. The user terminal as defined by claim 3, wherein
the user terminal transmits the wireless quality information on the first wireless section to the router and displays the contents, received from the router, on the radio wave state display unit.

14. The user terminal as defined by claim 10, wherein
the user terminal transmits the wireless quality information on the first wireless section to the router and displays the contents, received from the router, on the radio wave state display unit.

15. The user terminal as defined by claim 2, wherein
the user terminal receives the wireless quality in on the second wireless section from the router and determines the display contents.

16. The user terminal as defined by claim 3, wherein
the user terminal receives the wireless quality in on the second wireless section from the router and determines the display contents.

17. The user terminal as defined by claim 10, wherein
the user terminal receives the wireless quality in on the second wireless section from the router and determines the display contents.

18. A router, that functions as a wireless access point of a user terminal and transmits wireless quality information on the second wireless section to the user terminal, the wireless quality information being calculated based on a signal received from the base station connected via the second wireless communication method,
wherein the user terminal, comprises:
a wireless quality measurement unit that works according to a first wireless communication method and measures wireless quality thereof at a predetermined time interval; and
a radio wave state display unit that integrally displays a radio wave state from the user terminal to a base station based on both a wireless quality of a first wireless section and a wireless quality of a second wireless section where a second wireless communication method is used, the wireless quality of the second wireless section measured by a router.

19. A router, comprising:
a unit that connects to a base station via a second wireless communication method and functions as a wireless access point of a user terminal working according to a first wireless communication method, said router transmits to the user contents to be displayed on the user terminal as a radio wave state based on both a wireless quality of a first wireless section and a wireless quality of a second wireless section, said first wireless section being a section where the first wireless communication method is used and said second wireless section being a section where the second wireless communication method is used,
the second wireless communication method being different from the first wireless communication method,
the wireless quality of the first wireless section being received from the user terminal and measured by the user terminal, and
a wireless quality of the second wireless section being measured by said router.

20. A radio wave state display method, comprising:
measuring, by a user terminal, a wireless quality of a first wireless section, where a first wireless communication method is used, at a predetermined time interval, the user terminal working according to the first wireless communication method;
measuring, by a router, a wireless quality of a second wireless section where a second wireless communication method is used, the router connecting to a base station via the second wireless communication method and functioning as a wireless access point of the user terminal working according to the first wireless communication method, wherein the second wireless communication method different from the first wireless communication method; and
integrally displaying, by the router, a radio wave state ranging from the user terminal to the base station, on the user terminal based both on the wireless quality of the first wireless section and the wireless quality of the second wireless section.

* * * * *